Figure 1:
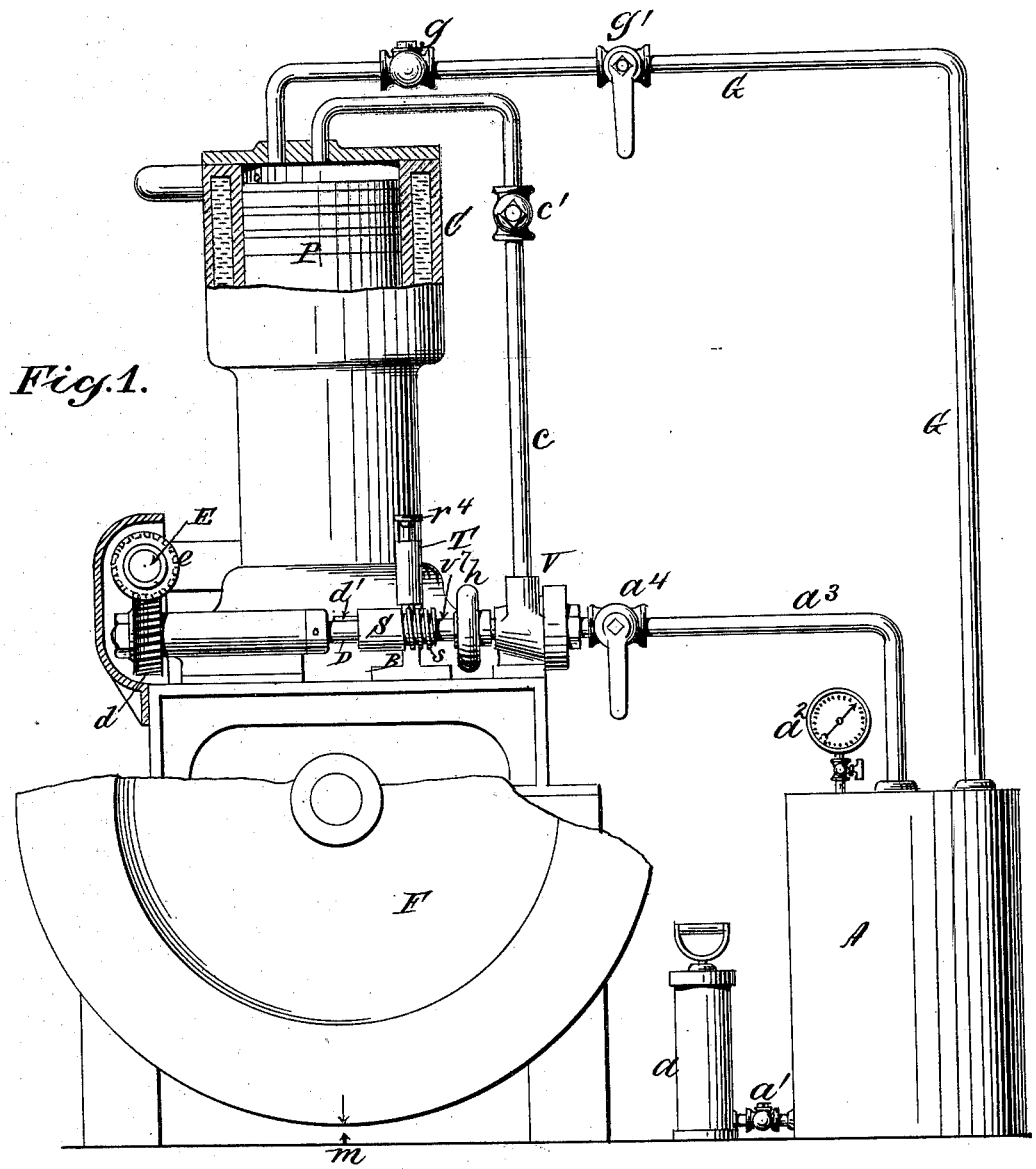

No. 735,256. PATENTED AUG. 4, 1903.
F. C. HIRSCH.
STARTING MECHANISM FOR OIL OR GASOLENE ENGINES.
APPLICATION FILED FEB. 28, 1902.
NO MODEL. 2 SHEETS—SHEET 1.

Witnesses:
D. W. Gardner.
F. E. Roack.

Inventor:
Feodor C. Hirsch
By his Attorney
Geo. Wm Meath

No. 735,256. PATENTED AUG. 4, 1903.
F. C. HIRSCH.
STARTING MECHANISM FOR OIL OR GASOLENE ENGINES.
APPLICATION FILED FEB. 28, 1902.
NO MODEL. 2 SHEETS—SHEET 2.
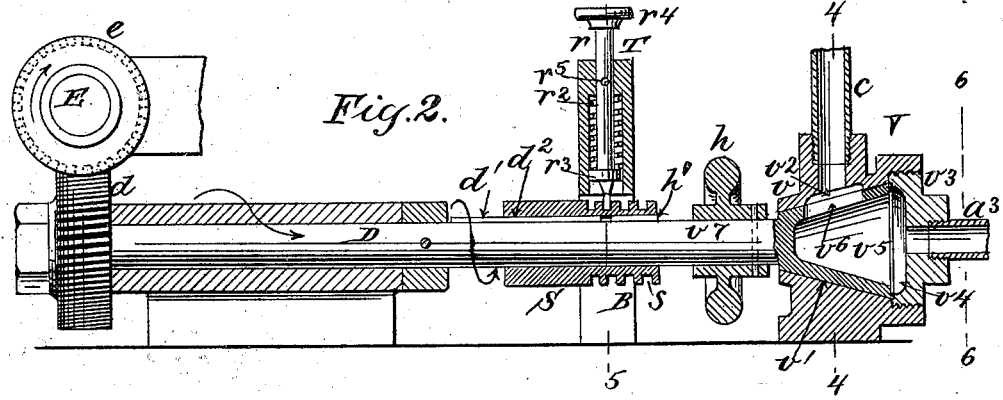
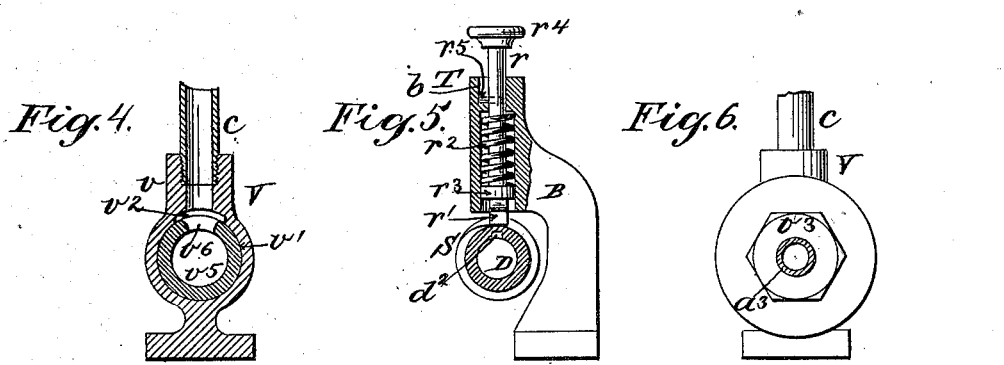
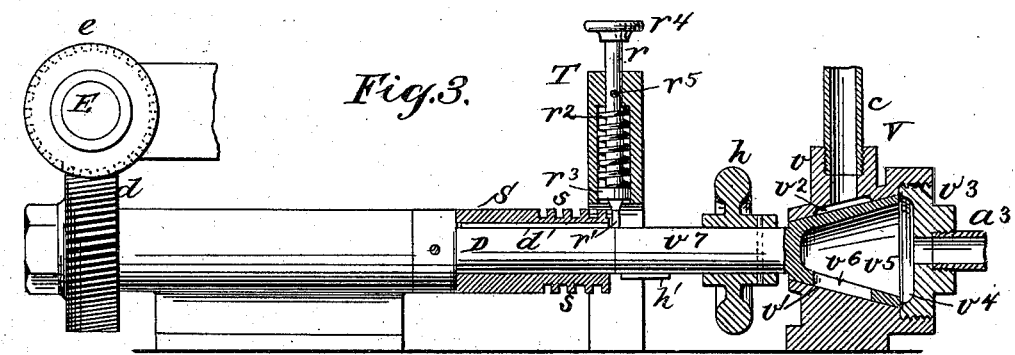

No. 735,256.

Patented August 4, 1903.

UNITED STATES PATENT OFFICE.

FEODOR C. HIRSCH, OF NEW YORK, N. Y., ASSIGNOR TO ABBOT AUGUSTUS LOW, OF HORSESHOE, NEW YORK.

STARTING MECHANISM FOR OIL OR GASOLENE ENGINES.

SPECIFICATION forming part of Letters Patent No. 735,256, dated August 4, 1903.

Application filed February 28, 1902. Serial No. 96,033. (No model.)

*To all whom it may concern:*

Be it known that I, FEODOR C. HIRSCH, a citizen of the United States, residing in the city, county, and State of New York, have invented certain new and useful Improvements in Starting Mechanism for Oil or Gas Engines, of which the following is a specification sufficient to enable others skilled in the art to which the invention appertains to make and use the same.

The object of my invention is to afford simple but convenient and effective means for starting a gas, oil, or other explosive engine in which one or more preliminary cycles or rotations are necessary in order to attain the momentum and speed essential to the automatic operation of the engine. This I accomplish by the use of compressed air controlled by mechanism embodying my invention and hereinafter described and claimed specifically.

In the accompanying drawings, Figure 1 is a sectional elevation illustrating the practical application of my invention to a single-cylinder engine. Fig. 2 is a sectional elevation through the starting-valve and operative connections, the valve being open; Fig. 3, a similar view showing the starting-valve closed. Fig. 4 is a section upon plane of line 4 4, Fig. 2; Fig. 5, a sectional elevation upon plane of line 5 5, Fig. 2; Fig. 6, a sectional elevation upon plane of line 6 6, Fig. 2.

A represents a compressed-air tank or reservoir provided with a hand-pump $a$ and check-valve $a'$ for use in effecting an initial charge of compressed air or when the ordinary method of charging the tank by means of the engine, as hereinafter set forth, is neglected or overlooked. The tank A is also provided with a pressure-gage $a^2$.

The starting-valve V is connected with the tank A by means of a pipe $a^3$, in which is interposed a stop-cock $a^4$.

The starting-valve V consists of the casing $v$, formed with a conical seat $v'$ and port $v^2$, the latter being connected by a pipe $c$ with the upper end of the engine-cylinder C. A check-valve $c'$ is interposed in the pipe $c$. The casing $v$ is closed by a screw-plug $v^3$, with which the pipe $a^3$ connects, said plug $v^3$ being formed with an opening $v^4$, communicating with the interior of the hollow valve-cone $v^5$, formed with the port $v^6$. This rotatable valve-cone $v^5$ has a stem $v^7$, preferably provided with a hand-wheel $h$, to facilitate the setting of the valve-cone, and the stem $v^7$ also has a spline $h'$ near its extremity.

In line with the longitudinal axis of the valve-cone $v^5$ and its stem $v^7$ is mounted the valve-driving shaft D, actuated through the medium of spiral gears $d$ and $e$ by the engine cam-shaft E, so that the said valve-driving shaft D rotates continuously in the direction of the arrows, Fig. 2.

The end of the valve-driving shaft D opposed to the valve-cone stem $v^7$ is also formed with a spline $d'$, corresponding in size to the spline $h'$ on the said stem.

A sleeve S is movable longitudinally in either direction upon the valve-driving shaft D, being formed with a groove $d^2$ for engagement with the splines $d'$ and $h'$. The periphery of this traveling sleeve S is formed with a screw-thread $s$. The sleeve is in permanent engagement with the spline $d'$ on the valve-driving shaft D and constantly rotates continuously therewith.

Mounted in a stationary arm or bracket B on the framework is a retractable tracer or impulse-regulator T, consisting of a rod $r$, the lower end of which is formed with a stud $r'$ for engagement with the screw-thread $s$ upon the sleeve S, the rod $r$ being pressed downward by a spring $r^2$ in the bracket B, acting against the shoulder $r^3$ on the rod, which may be raised against the action of the spring by a handle $r^4$ and held so that its stud $r'$ is out of engagement with the screw-thread $s$ on the sleeve S by means of a pin $r^5$, adapted to engage with the top of the bracket when the rod is turned slightly for this purpose, but otherwise resting in the recess $b$ in the bracket B.

G is a pipe leading from the air-tank A to the upper end of the cylinder C, said pipe being provided with a check-valve $g$ and a stop-cock $g'$.

The operation is as follows: Presuming the absence of compressed air in the tank A, the hand-pump $a$ is utilized in forcing air into said tank until the pressure-gage indicates the desired degree of tension. The stop-cocks $g'$ and $a^4$ in the pipes G and $a^3$ being closed, the fly-wheel is set to the starting-mark $m$, in which position the crank is a little beyond the dead-center, with the piston P near the top of the cylinder C. By means of the hand-wheel $h$ the valve-cone $v^5$ and its stem $v^7$ are now turned to bring the port $v^6$ into coincidence with the port $v^2$, in which position the spline $h'$ is also uppermost, as seen in Fig. 2, and in line with the spline $d'$ and slot in the sleeve S, so that the latter (when the rod $r$ is raised) can readily be slid forward over the end of the stem $v^7$ and its spline $h'$, as shown, and the rod $r$ lowered, so as to bring its stud $r'$ into engagement with the screw $s$. Since each convolution of the latter represents a rotation of the valve-driving shaft D, it is obvious that by moving the sleeve forward one, two, three, or more convolutions and bringing the stud $r'$ into engagement with the screw at such desired point the prescribed number of rotations may be imparted to the valve-cone $v^5$ and its stem $v^7$, owing to the fact that the sleeve S couples the said stem $v^7$, to the valve-driving shaft D and maintains the connection until the sleeve S by reason of the engagement of the stud $r'$ with the screw $s$ is driven back sufficiently to release itself from the stud $r'$ and from the spline $h'$, as shown in Fig. 3, when the rotation of the valve-cone $v^5$ will cease.

It is to be understood that prior to the above action the stop-cock $a^4$ has been opened, so as to admit compressed air to the space $v^4$ in the valve-casing, and hence each rotation of the valve-cone $v^5$ has resulted in an impulse exerted against the piston P to start the engine and enable it to attain the momentum requisite to maintain automatic action under the explosions of hydrocarbon-vapor in the usual and well-known way. When this is accomplished, the stop-cock $a^4$ is closed.

In order to recharge the tank A or raise the pressure therein to the desired degree, the stop-cock $g'$ may be opened for a time, resulting in the forcing of the gases from the cylinder S into the tank A, to be stored by the closing of the cock $g'$ until required for use in restarting the engine.

What I claim as my invention, and desire to secure by Letters Patent, is—

1. In combination with an explosive-engine, a tank for storing gases under pressure, the valve-shaft, and the two independent splines, a starting-valve arranged to admit the compressed gas from said tank to the engine-cylinder, and means carried by a continuously-rotating valve-driving shaft for operating and controlling said valve through the medium of the cam-shaft of the engine, substantially as set forth.

2. The combination with an explosive-engine of the tank A, the starting-valve V, the controller T, the valve-driver shaft D, the two splines $d'$, $h'$ actuated by the cam-shaft, and the threaded sleeve S, mounted to revolve with the valve-driver shaft, as and for the purpose described.

3. The combination with an explosive-engine, of the tank A, the pipe $a^3$, and cock $a^4$, the valve V, shaft D, splines $d'$, $h'$, the threaded sleeves S, mounted to revolve with said shaft, and the controller T actuated by said sleeve as and for the purpose described.

4. The combination with an explosive-engine, of the cylinder C, the tank A, the pipe G, connecting said tank with the cylinder C, and the check-valve $g$ in said pipe between the tank and cylinder, the impulse-controller, the valve-driving shaft and the sleeve revolving therewith and coöperating with said controller, and stop-cock $g'$, and splines $d'$, $h'$, substantially as and for the purpose described.

5. The combination with an explosive-engine, of the tank A, pipe $a^3$, cock $a^4$, valve V, the valve-cone stem and its spline, pipe $c$, connecting with the cylinder C, the check-valve $c'$, the valve-driving shaft D having splines $d'$ and actuated by the engine cam-shaft, the threaded sleeve S, mounted to revolve with said shaft, and the controller T, and coöperating with said sleeve, as and for the purpose described.

6. The combination of an explosive-engine, of the tank A, the pipe $a^3$, the cock $a^4$, the valve V having the valve-cone $v^5$, and stem $v^7$, formed with the spline $h'$, the valve-driving shaft D, actuated by the cam-shaft, and formed with the spline $d'$, the sleeve S, mounted to revolve with said shaft D and formed with the screw-thread $s$, and the controller T, coöperating with said sleeve and consisting of the retractile rod $r$, the lower end of which is in engagement with said screw-thread, arranged and operating substantially in the manner and for the purpose set forth.

FEODOR C. HIRSCH.

Witnesses:
D. W. GARDNER,
F. E. ROACH.